UNITED STATES PATENT OFFICE.

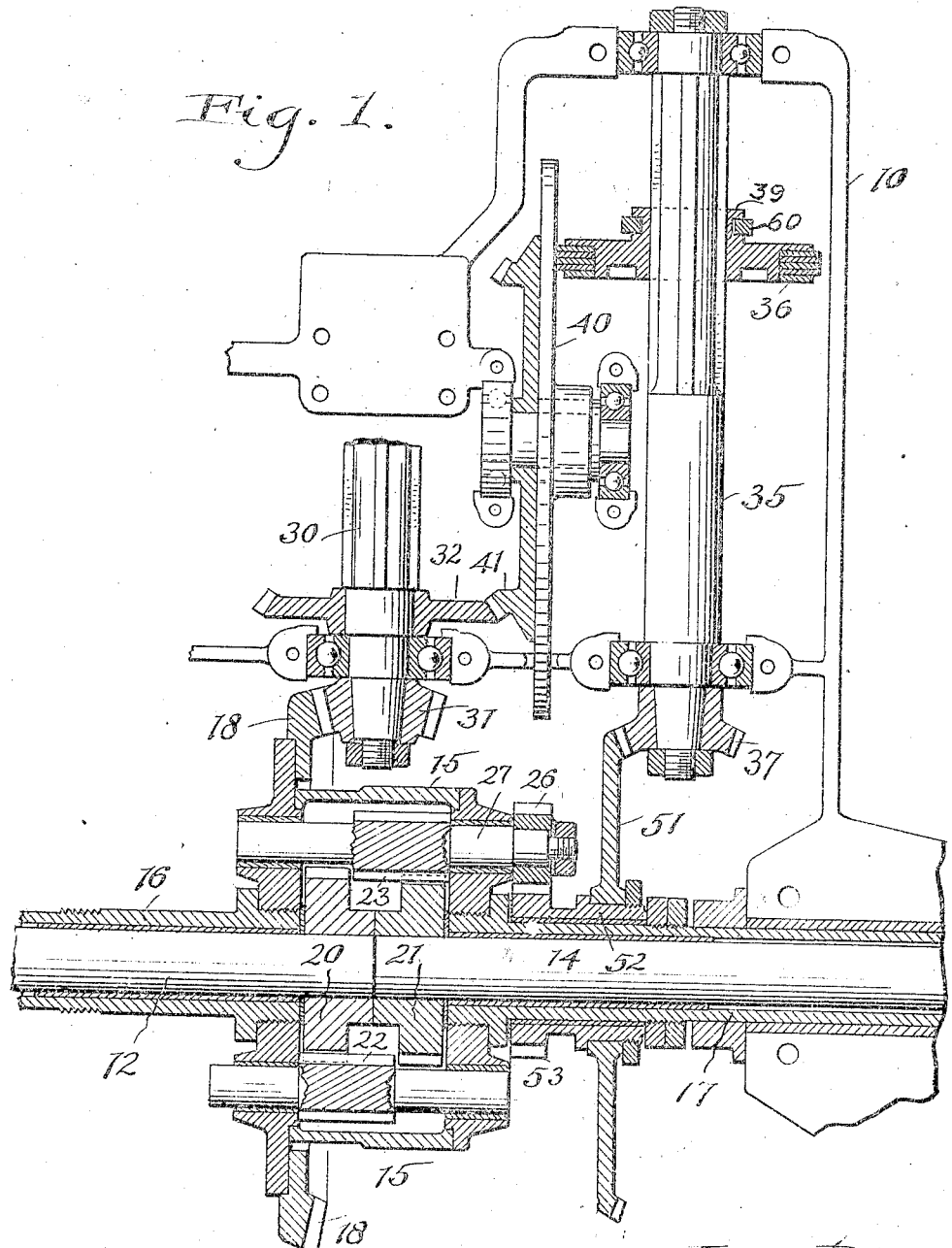

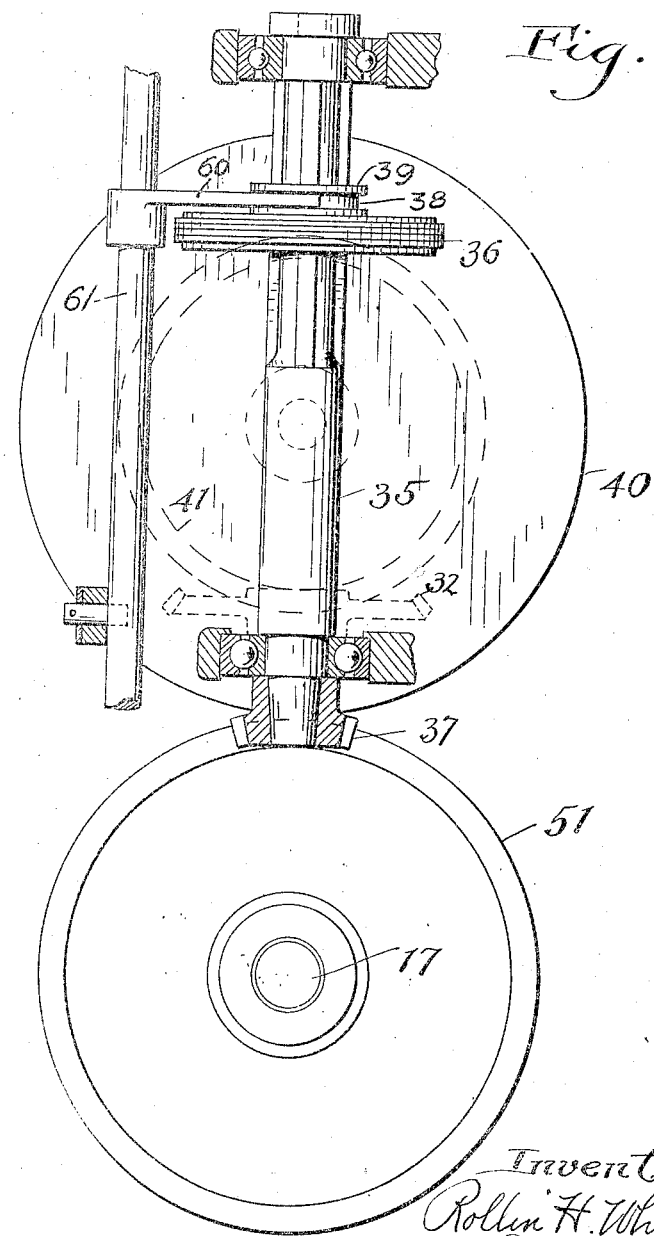

ROLLIN H. WHITE, OF CLEVELAND HEIGHTS, OHIO, ASSIGNOR TO THE CLEVELAND TRACTOR COMPANY, OF EUCLID, OHIO, A CORPORATION OF OHIO.

DRIVING AND STEERING MECHANISM FOR MOTOR-VEHICLES.

1,401,221.　　　　Specification of Letters Patent.　　Patented Dec. 27, 1921.

Application filed January 22, 1919. Serial No. 272,414.

*To all whom it may concern:*

Be it known that I, ROLLIN H. WHITE, a citizen of the United States, residing at Cleveland Heights, in the county of Cuyahoga and State of Ohio, have invented a certain new and useful Improvement in Driving and Steering Mechanism for Motor-Vehicles, of which the following is a full, clear, and exact description.

The object of this invention is to provide efficient mechanism, adapted to form a part of the power transmitting mechanism intermediate of the motor and the two driven shafts by which the driving wheels of a motor vehicle are turned, by means of which both driven shafts may be positively turned at the same velocity, or at velocities which are differentiated to any extent desired to the end that the vehicle may be driven in a straight path or turned in either direction in a short or long curve as desired.

Mechanisms of this general sort are most commonly used on track laying tractors, which have two track belts, located on opposite sides of a main motor supporting frame;—in which case the driving wheels are sprocket wheels by means of which the track chains are operated. The present invention is especially designed for that particular use; but may be used, either in the exact form shown or slightly modified, to suit a different environment, on other kinds of motor vehicles if desired.

The invention consists in the construction and combination of parts shown in the drawings and hereinafter described and definitely pointed out in the appended claims.

In the drawings, Figure 1 is a sectional plan view of mechanism in which the present invention is embodied in what is regarded as its preferred form; Fig. 2 is a side elevation of said mechanism from the right side of Fig. 1.

Referring to the parts by reference characters, 10 represents a frame member which is to be secured to the motor supporting frame of the tractor. It is preferably in the form of a hollow casing; but need not be.

12 and 14 represent two alined shafts, from which motion is to be transmitted by suitable means to the two driving wheels of the vehicle; and the function of this invention is to rotate these two shafts at the same rate, or at such differentiated rates as may be desired.

It will be understood that suitable mechanism must be provided for transmitting motion from these two driven shafts by the driving wheels of the vehicle; but since such mechanism is known in a variety of forms it has not been thought necessary to show any mechanism for that purpose.

15 represents the hollow drum of certain spur gear differential gearing, which, except for certain additions, to which attention will be called, is of conventional type. This drum has at its ends two oppositely extended alined hollow hubs 16, 17, which are rotatably mounted in the frame member 10. The driven shafts 12 and 14 are rotatively mounted in these two hubs respectively, and project from the ends thereof. They likewise project into the drum; and the gears 20, 21, are respectively secured to said shafts within the drum. Two series of compensating pinions 22, 23, are mounted upon and within the drum, so that their axes are parallel with the axis of the drum. All of the pinions 22 mesh with the gear 20, and all of the pinions 23 mesh with the gear 21, and each of the pinions 22 of one series meshes with a pinion 23 of the other series. A ring gear 18 is fixed to the differential drum; and this is in mesh with a pinion 31 on a shaft 30, which is the driving shaft for the differential mechanism. This shaft is to be suitably connected with the motor, but it is of no consequence to the present invention what particular mechanism is provided for this purpose.

The differential mechanism as thus far explained, is of conventional form, and its function and mode of operation is well understood and therefore requires no extended explanation. It will be sufficient here to call attention to the fact that if, while the drum is being turned, the compensating pinions 22, 23, do not turn on their axes, both shafts 12, 14, must rotate in unison with the drum; whereas if the compensating pinions 22, 23, do turn upon their axes, regardless of how such turning is produced, the said two shafts will be turned, the one slower and the other correspondingly faster than the differential drum.

35 represents a shaft which is mounted in bearings carried by member 10, said shaft being parallel with the driving shaft. On this shaft is a friction wheel 36 which has a tongue and groove driving connection with the shaft, which permits said wheel to move lengthwise of said shaft.

This wheel is in peripheral engagement with a friction disk 40 which is rotatably supported on frame member 10 with its axis at right angles to the axes of the two shafts 30 and 35. A bevel gear 41 fixed to this friction disk is in mesh with a bevel gear 32 fixed to shaft 30. Therefore while shaft 30 rotates, the friction disk 40 will be rotated; and thereby the shaft 35 will be turned at a rate which depends upon the distance from the axis of the friction disk 40 of the point at which the friction wheel 36 engages therewith.

On shaft 35 is a bevel gear 37, which meshes with a bevel gear 51 fixed to a gear sleeve 52 that is rotatively mounted on the drum hub 17. This gear sleeve carries a pinion 53, which is in mesh with a pinion 26 that is fixed to the projecting outer end of a shaft 27 which is rotatively mounted in the ends of the differential drum,—and it is to this shaft that one of the compensating pinions 22, 23, is secured within the drum,— it being one of the pinions 23 in the case shown.

It is apparent that there is a position of the friction wheel 36 with respect to the axis of the friction disk 40, which will result in the rotation of shaft 35 at a rate such that, through the described gearing, the gear sleeve 52 will be turned at exactly the same rate as the differential drum. In that event the compensating pinion shaft 27 will not be turned upon its axis,—is in fact, locked against such turning,—and therefore both shafts 12, 14, will as before explained, be turned in unison with the differential drum, that is, in the same direction and at the same rate.

If, however, the friction wheel 36 be moved along shaft 35 away from the axis of the friction disk 40, the velocity of shaft 35 will be accelerated; wherefore the gear sleeve 52 will be turned faster than the differential drum and in the same direction. This acceleration of the gear sleeve 52 relative to the drum 15 will cause shaft 27 and the compensating pinion 23 thereon, to be turned on their axis; and therefore, because of the intermeshing of pinion 23 with gear 21 on axle shaft 14, the latter will be turned relatively to the drum but in the same direction. Or in other words, said axle shaft will be turned faster than the differential drum. The velocity of the shaft 14 will then equal the velocity of the differential drum plus the acceleration in velocity due to the described turning of the compensating gear 23.

But the turning of the compensating pinion 23 on its axis in one direction will necessarily cause a corresponding turning in the reverse direction of the compensating pinion 23 with which it meshes. And this turning of the compensating pinion 22 will cause the shaft 12 to be turned backward relatively to the drum, this backward turning of axle shaft 12 relatively to the drum being at the same rate as the forward turning of axle shaft 16 relative to the drum. The net result will be that the velocity of axle shaft 12 will be equal to the velocity of the differential drum minus the retardation due to the turning of the compensating pinion 23.

It is clear that the farther the friction wheel 36 is moved from the axis of the friction disk, the greater will be the acceleration of the velocity of the shaft 14; and that at all times there will be a corresponding retardation of the axle shaft 12. If, however, the friction wheel 36 be moved toward the axis of the friction disk,—from what may be called the neutral position which is that shown, it will cause a retardation in the velocity of the shaft 14, and a corresponding acceleration in the velocity of the shaft 12.

Any suitable mechanism may be provided for controlling the position of the friction wheel 36. As shown there is an annular groove 38 in the hub 39 of the wheel. A forked arm 60 engages the groove, and is fixed to an endwise movable bar 61. Any suitable mechanism may be provided for moving this bar endwise in either direction and any desired distance. By causing the stated movements of bar 61 in one direction or the other, the operator may so control the described mechanism that it will rotate the two shafts 12, 14 at the same velocity, or will turn either axle shaft faster than the other, and produce any desired differentiation in the velocity of these two shafts. And at all times both axle shafts will be positively driven, and there will be almost no friction losses due to producing the differentiated motion of the two axle shafts.

The gear ratios in the mechanism as shown, are such that the retardation of one shaft,—that is the backward movement of said shaft, can never equal the forward turning movement imparted to said shaft by the differential mechanism. Therefore, the slowest turning shaft will always turn in the same direction as the differential drum. The ratios of the gears as shown have been adopted to insure that both axle shafts shall always be turned in the same direction, because that always insures the forward, if unequal, movement of both sides of the vehicle. But by merely making changes in the gear ratios the described construction could be so reorganized that the backward velocity of one shaft relative to the differential drum could be greater than forward velocity of the drum, in which event one shaft would be turned slowly backward while the other would be turned forward at a velocity of more than twice that of the drum.

Having described my invention, I claim:

1. In power transmitting mechanism for track laying tractors and other forms of motor vehicles, the combination of two alined driven shafts, differential gearing therebetween, which differential gearing includes compensating pinions, means to rotate the differential gearing, and independent means to rotate a compensating pinion in either direction about its own axis and to thereby cause either of said driven shafts to rotate faster than the other.

2. In power transmitting mechanism for track laying tractors and other forms of motor vehicles, the combination of two alined driven shafts, a rotatable differential drum which is co-axial with said shafts and into which both project, gears fixed respectively to said shafts within said drum, compensating pinions mounted on the drum in mesh with said gears, means to rotate the differential drum, and means operable while the drum is in rotation to turn one of said compensating pinions about its own axis in either direction and at any desired rate.

3. In power transmitting mechanism for track laying tractors and other forms of motor vehicles, the combination of two alined driven shafts, differential gearing therebetween, said differential gearing including compensating pinions located within and mounted upon the differential drum, one of said compensating pinions being secured to a shaft which projects outside of said drum, means to rotate the drum, and independent means acting on the projecting end of said compensating pinion shaft to turn it upon its own axis in either direction and at various rates of speed.

4. In power transmitting mechanism for track laying tractors and other forms of motor vehicles, the combination of two driven shafts, differential gearing therebetween, means to rotate said differential gearing, a rotatable sleeve mounted coaxially with respect to said differential gearing, gearing intermediate of said sleeve and one of the compensating pinions of said differential gearing, and variable speed mechanism for turning said sleeve.

5. In power transmitting mechanism for track laying tractors and other forms of motor vehicles, the combination of two driven shafts, differential gearing therebetween, means to rotate said differential gearing, a rotatable sleeve mounted coaxially with respect to said differential gearing, gearing intermediate of said sleeve and one of the compensating pinions of said differential gearing, a shaft geared to said sleeve for turning it, and variable speed mechanism for turning said shaft.

6. In power transmitting mechanism for track laying tractors and other forms of motor vehicles, the combination of two driven shafts, differential gearing therebetween, means to rotate said differential gearing, a rotatable sleeve mounted coaxially with respect to said differential gearing, gearing intermediate said sleeve and one of the compensating pinions of said differential gearing, and variable speed friction driving mechanism for said sleeve.

7. In power transmitting mechanism for track laying tractors and other forms of motor vehicles, the combination of two driven shafts, differential gearing therebetween, means to rotate said differential gearing, a rotatable sleeve mounted coaxially with respect to said differential gearing, gearing intermediate said sleeve and one of the compensating pinions of said differential gearing, a shaft geared to said sleeve for driving it, and variable speed friction drive mechanism for turning said shaft.

8. In power transmitting mechanism for track laying tractors, and other forms of motor vehicles, the combination of two driven shafts, differential gearing therebetween, a friction disk, a driving member, mechanism by which said friction disk and differential gearing are rotated by said driving member, a rotatable sleeve mounted coaxially with respect to said differential gearing, gearing intermediate said sleeve and one of the compensating pinions of said differential gearing, a shaft which is geared to said sleeve, a friction wheel which has a tongue and groove driving connection with the last named shaft and has its periphery in engagement with said friction disk, and means for shifting said friction wheel lengthwise of said shaft.

9. In power transmitting mechanism for track laying tractors and other forms of motor vehicles, the combination of two driven shafts, spur gear differential mechanism therebetween including a differential drum, two series of intermeshing compensating pinions mounted on said drum and gears fixed to said driven shafts and meshing respectively with the compensating pinions of said two series of compensating pinions,— one of said compensating pinions being fixed to a shaft which extends outside of said drum and has a gear fixed to its projecting outer end, a gear which is mounted coaxially with said differential drum and is in mesh with the last mentioned gear, mechanism for turning said differential drum, and other mechanism by which to turn said coaxial gear in the same direction as the differential drum and at the same velocity or faster or slower as desired.

In testimony whereof I hereunto affix my signature.

ROLLIN H. WHITE.